(12) United States Patent
Zhang

(10) Patent No.: US 6,252,856 B1
(45) Date of Patent: Jun. 26, 2001

(54) METHOD AND APPARATUS FOR MINIMIZING CALCULATIONS REQUIRED TO CONSTRUCT MULTICAST TREES

(75) Inventor: Zhaohui Zhang, Billerica, MA (US)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 08/984,453

(22) Filed: Dec. 3, 1997

Related U.S. Application Data

(60) Provisional application No. 60/032,439, filed on Dec. 3, 1996.

(51) Int. Cl.[7] .................................................. H04L 12/28
(52) U.S. Cl. ............................................ 370/254; 370/408
(58) Field of Search .................................. 370/238, 237, 370/351, 400, 911, 401, 468, 408, 254, 256; 395/200

(56) References Cited

U.S. PATENT DOCUMENTS

| | | | |
|---|---|---|---|
| 4,740,954 | | 4/1988 | Cotton et al. . |
| 4,742,511 | * | 5/1988 | Johnson ................................ 370/406 |
| 4,864,559 | * | 9/1989 | Perlman ................................. 370/60 |
| 4,873,517 | * | 10/1989 | Baratz et al. ......................... 340/825 |
| 5,088,032 | * | 2/1992 | Bosack ................................. 395/200 |
| 5,289,460 | * | 2/1994 | Drake, Jr. et al. ................... 370/245 |
| 5,291,477 | | 3/1994 | Liew . |
| 5,309,433 | | 5/1994 | Cidon et al. . |
| 5,331,637 | | 7/1994 | Francis et al. . |
| 5,355,371 | * | 10/1994 | Auerbach et al. ...................... 370/60 |
| 5,471,467 | * | 11/1995 | Johann ................................. 370/60 |
| 5,491,690 | * | 2/1996 | Alfonsi et al. ......................... 370/60 |
| 5,600,638 | * | 2/1997 | Bertin et al. ......................... 370/351 |
| 5,600,794 | * | 2/1997 | Callon .............................. 395/200.01 |
| 5,737,526 | * | 4/1998 | Periasamy et al. ............. 395/200.06 |
| 5,754,790 | * | 5/1998 | France et al. .................... 395/200.68 |
| 5,854,899 | * | 12/1998 | Callon et al. .................... 395/200.68 |
| 5,881,246 | * | 3/1999 | Crawley et al. ................. 395/200.68 |
| 5,943,317 | * | 8/1999 | Brabson et al. ..................... 370/239 |
| 5,953,312 | * | 9/1999 | Crawley et al. ..................... 370/218 |
| 5,964,841 | * | 10/1999 | Rekhter ............................... 709/242 |
| 5,995,503 | * | 11/1999 | Crawley et al. ..................... 370/351 |

OTHER PUBLICATIONS

J. Moy, OSPF Version 2, Network Working Group, Mar. 1994, Document pp. 1–1216 printed pp. 1–166.

J. Moy, Multicast Extensions to OSPF, Network Working Group, Mar. 1994, Document pp. 1–70.

J. Moy, MOSPF: Analysis and Experience, Network Working Group, Mar. 1994, Document pp. 1–12, printed pp. 1–11.

\* cited by examiner

*Primary Examiner*—Chau Nguyen
*Assistant Examiner*—Chiho Andrew Lee
(74) *Attorney, Agent, or Firm*—Blakely Sokoloff Taylor & Zafman LLP

(57) ABSTRACT

A system is provided for recalculating multicast trees by identifying a network change associated with a network area. In response to the network change, forwarding entries in the network area are recalculated. Additionally, the system recalculates forwarding entries affected by the changed summary information in other areas resulting from the identified change. Forwarding entries associated with a group may be recalculated in response to receiving a new group membership link state advertisement (LSA). The system determines whether the originator of the LSA is reachable from a calculating router. If the LSA is reachable from the calculating router, then the forwarding entries associated with the group are recalculated. If the LSA is not reachable from the calculating router, then the forwarding entries associated with the group are not recalculated. Additionally, multicast tree construction can be terminated if all of the calculating router's interfaces that have adjacent neighbors have been added to the forwarding table for the tree, or if all of the calculating router's downstream vertices have been added to a candidate list. Multicast tree construction may also be terminated if all of the reachable group membership LSAs for the tree have been considered.

58 Claims, 8 Drawing Sheets

METHOD AND APPARATUS FOR MINIMIZING CALCULATIONS REQUIRED TO CONSTRUCT MULTICAST TREES

This application claims the benefit, under 35 U.S.C. section 119(e), of provisional application Ser. No. 60/032,439, filed on Dec. 3, 1996.

BACKGROUND OF THE INVENTION

1. Field of the Invention

The present invention relates to systems for routing data through one or more networks. More specifically, the invention provides a system for minimizing unnecessary routing calculations in a network environment and thereby improves the utilization of computational resources.

2. Background

Data communication networks may include various nodes, routers, switches, hubs, and other network devices coupled to and communicating with one another. Data is communicated between network devices by utilizing links between the devices. A particular data packet (or data cell) may be handled by multiple network devices and cross multiple links as it travels between a source and a destination. Additionally, multiple networks may be coupled to one another by common network devices or common links.

Various protocols can be used to communicate routing information through a network. One type of protocol is referred to as a link state protocol, in which each node in the network knows the network topology such that the node can calculate routes through the network using the known topology. The link state information is distributed to network nodes using a series of Link State Advertisements (LSAs) originated by routers and other nodes in the network. For example, a router may advertise LSAs into the network area in which the router resides. These advertised LSAs may indicate that the router has connections to one or more nodes. These LSAs are received by other routers and nodes in the network. Thus, the other routers and nodes learn of the connections described in the advertised LSAs. All routers in the network may generate and advertise similar LSAs.

Since each router "learns" the network topology by receiving various LSAs, each router is capable of independently calculating routes through the network.

An example of a link state routing protocol is the Open Shortest Path First (OSPF) routing protocol. Each router running the OSPF protocol maintains an identical database describing the network topology. Using this topology database, each router is able to generate a routing table by constructing a shortest-path tree with the router at the root of the tree. OSPF is a dynamic routing protocol; i.e., OSPF detects changes in network topology and recalculates paths based on the new topology. Typically, all routers in an autonomous network run the OSPF protocol simultaneously.

OSPF allows multiple networks and routers to be grouped together. These groupings are commonly referred to as areas. The specific topology of a particular area is not broadcast to other areas. Instead, a summary of the area topology is transmitted to other areas, thereby reducing the amount of link state information that must be transmitted through the network. Since a router may be connected to more than one area, each router that borders multiple areas maintains a separate topology database for each area. A separate copy of OSPF's basic routing algorithm is executed in each area. Additionally, routing within a particular area is determined only by the topology of the particular area. Each area may use a different authentication scheme, such that some areas use stricter authentication schemes than other areas.

Mutlticast Open Shortest Path First (MOSPF) is a multicasting extension to OSPF. Multicasting is the distribution of data from a source to multiple destinations. The multiple destinations may be members of a multicast group such that each member of a multicast group receives data addressed to the group. By adding a new type of LSA, the group membership LSA, MOSPF is able to determine the location of all multicast group members in the network.

In standard MOSPF, a multicast tree for a source-group flow is calculated (or constructed) in each area to reach all possible routers and networks (and hence all group members) in that area. During the construction of the multicast tree, group member information is checked when a vertex (a router or a network) is moved from the candidate list to the Shortest Path First (SPF) tree. The SPF tree contains multiple vertices and various information related to each vertex in the tree. The information related to each vertex may include the type of vertex (e.g., a router or a network), the vertex ID, and information regarding the link(s) associated with the vertex. Each vertex in the SPF tree includes a pointer to the parent of the vertex.

If a vertex is downstream from the calculating router and has associated group members, then the calculating router's interface that leads to the vertex becomes a downstream interface for the source-group flow. In this situation, an entire tree is constructed even if there is no group member in the area, thereby inefficiently utilizing computational resources.

When new router LSAs or network LSAs are received or originated, all multicast forwarding entries are deleted and the new forwarding entries are recalculated on demand (i.e., new multicast trees are constructed on demand in all areas). When a new group membership LSA is received or originated, all the multicast forwarding entries related to the group are also deleted and then recalculated on demand in all the areas. This complete reconstruction of multicast trees inefficiently utilizes computational resources in a multi-area situation because it is likely that only a small portion of the forwarding entries need to be reconstructed in some areas.

It is therefore desirable to provide a system that minimizes unnecessary calculations of multicast trees and thereby improves the efficient utilization of computational resources.

SUMMARY OF THE INVENTION

The present invention provides a system that minimizes unnecessary calculations of multicast trees and thereby improves the utilization of computational resources.

An embodiment of the invention provides a system for recalculating multicast trees by identifying a change associated with a network area. In response to the change in the network area, forwarding entries are recalculated in the network area. If the change results in the change of summary LSAs advertised into other areas, forwarding entries affected by the changed summary LSAs are also recalculated in those areas.

An alternate embodiment of the invention recalculates multicast trees in response to receiving a new group membership LSA. The system then determines whether the originator of the LSA is reachable from a calculating router. If the originator of the LSA is reachable from the calculating router, then the forwarding entries associated with the group are recalculated. If the originator of the LSA is not reachable from the calculating router, then the forwarding entries associated with the group are maintained, but not recalculated.

Another embodiment of the invention provides a system for terminating the construction of a multicast tree. Multicast tree construction may be terminated when all of the calculating router's interfaces that have adjacent neighbors have been added to the forwarding table for the tree.

Other embodiments of the invention terminate construction of the multicast tree when all of the calculating router's downstream vertices have been moved to the tree.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, components, protocols, and circuits have not been described in detail so as not to obscure the invention.

Embodiments of the present invention provide a system that minimizes unnecessary calculations of multicast trees and thereby improves the efficient utilization of computational resources. By avoiding unnecessary calculations (or recalculations), the overall computation burden is reduced.

The teachings of the present invention may be used with a variety of network types and network topologies. Although certain routing protocols (such as MOSPF) are discussed to illustrate various embodiments of the invention, those of ordinary skill in the art will appreciate that the invention may also be practiced with other routing protocols. Furthermore, various aspects of the invention will be described with reference to example networks containing one or more routers. However, it will be appreciated that the invention can be used with any type of communication device, including network switches and other network communication devices.

Figure 1:
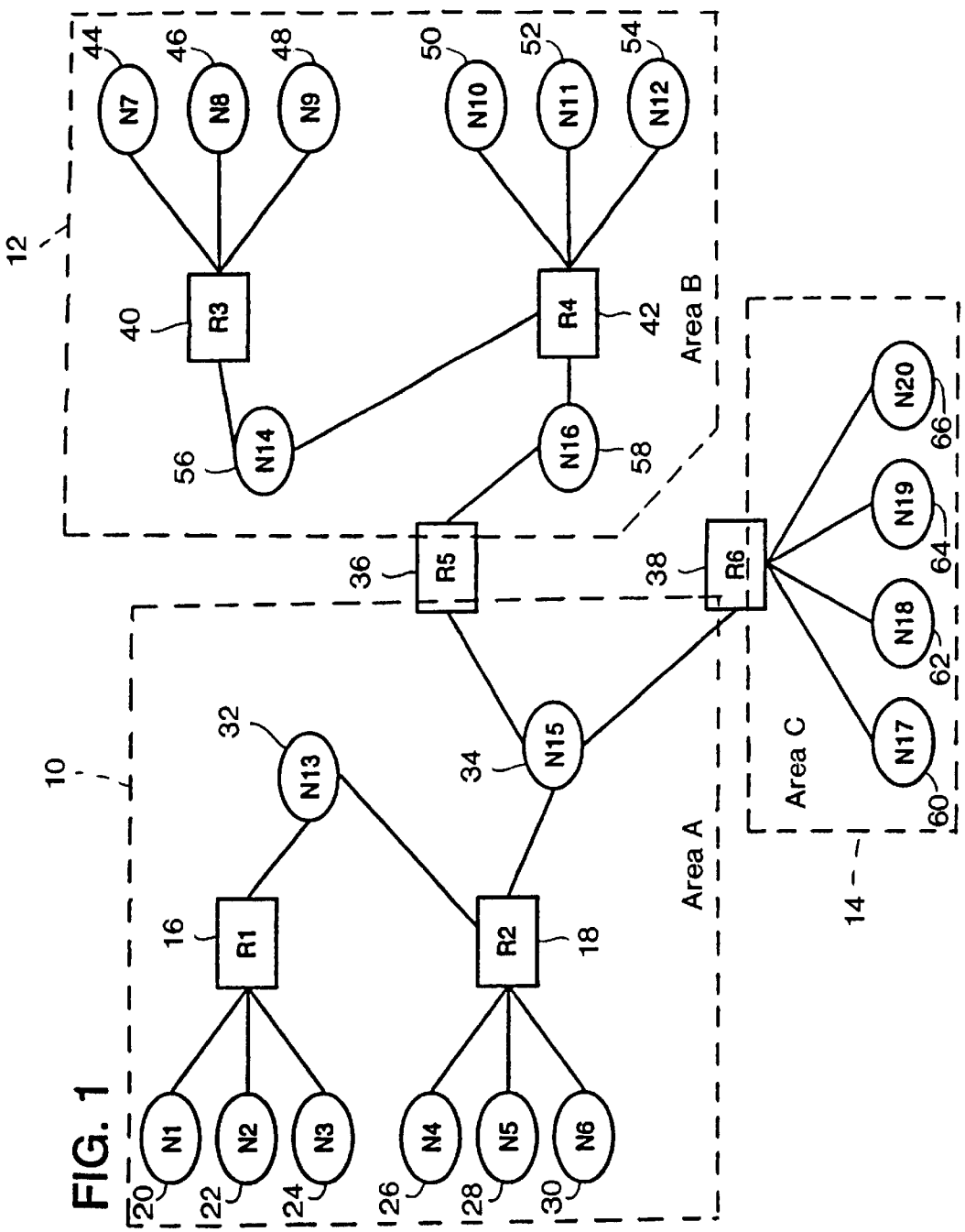
FIG. 1 illustrates an example network configuration containing multiple network devices arranged in multiple areas.
Figure 2:
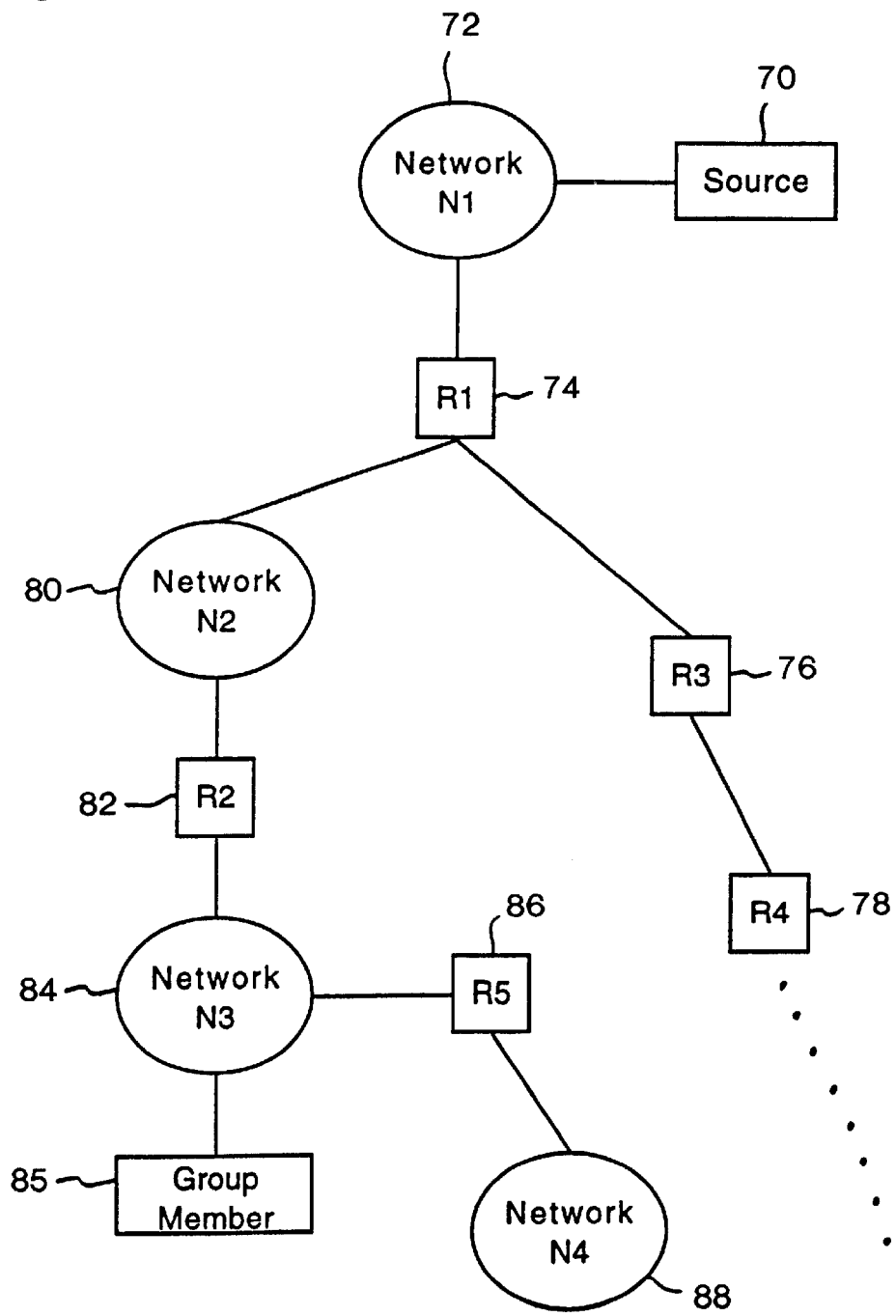
FIG. 2 illustrates another example network.

FIGS. 1 and 2 illustrate example networks capable of using the teachings of the present invention. FIGS. 1 and 2 will be used to illustrate various aspects and embodiments of the present invention. The network of FIG. 1 includes three different areas 10, 12, and 14 (also referred to as Area A, Area B, and Area C, respectively). Area 10 includes a pair of routers 16 and 18. Router 16 is coupled to networks 20, 22, and 24, and router 18 is coupled to networks 26, 28, and 30. A network 32 is coupled to both routers 16 and 18, and a network 34 is coupled to routers 18, 36, and 38. Router 36 is capable of communicating with areas 10 and 12, and router 38 is capable of communicating with areas 10, and 14.

Area 12 of FIG. 1 includes a router 40 coupled to networks 44, 46, and 48, and a router 42 coupled to networks 50, 52, and 54. A network 56 is coupled to both routers 40 and 42, and a network 58 is coupled to routers 36 and 42. Area 14 includes networks 60, 62, 64, and 66 coupled to router 38.

FIG. 2 illustrates a portion of a network configuration including a source node 70 coupled to a network 72, which is coupled to a router 74. Router 74 is coupled to a network 80 and a router 76, which is coupled to router 78. Router 78 may be coupled to other networks or routers (not shown). Network 80 is coupled to a router 82, which is coupled to another network 84. Network 84 is coupled to a group member node 85 and a router 86, which is coupled to a network 88. Network 88 may be coupled to additional networks or routers (not shown).

Figure 3:
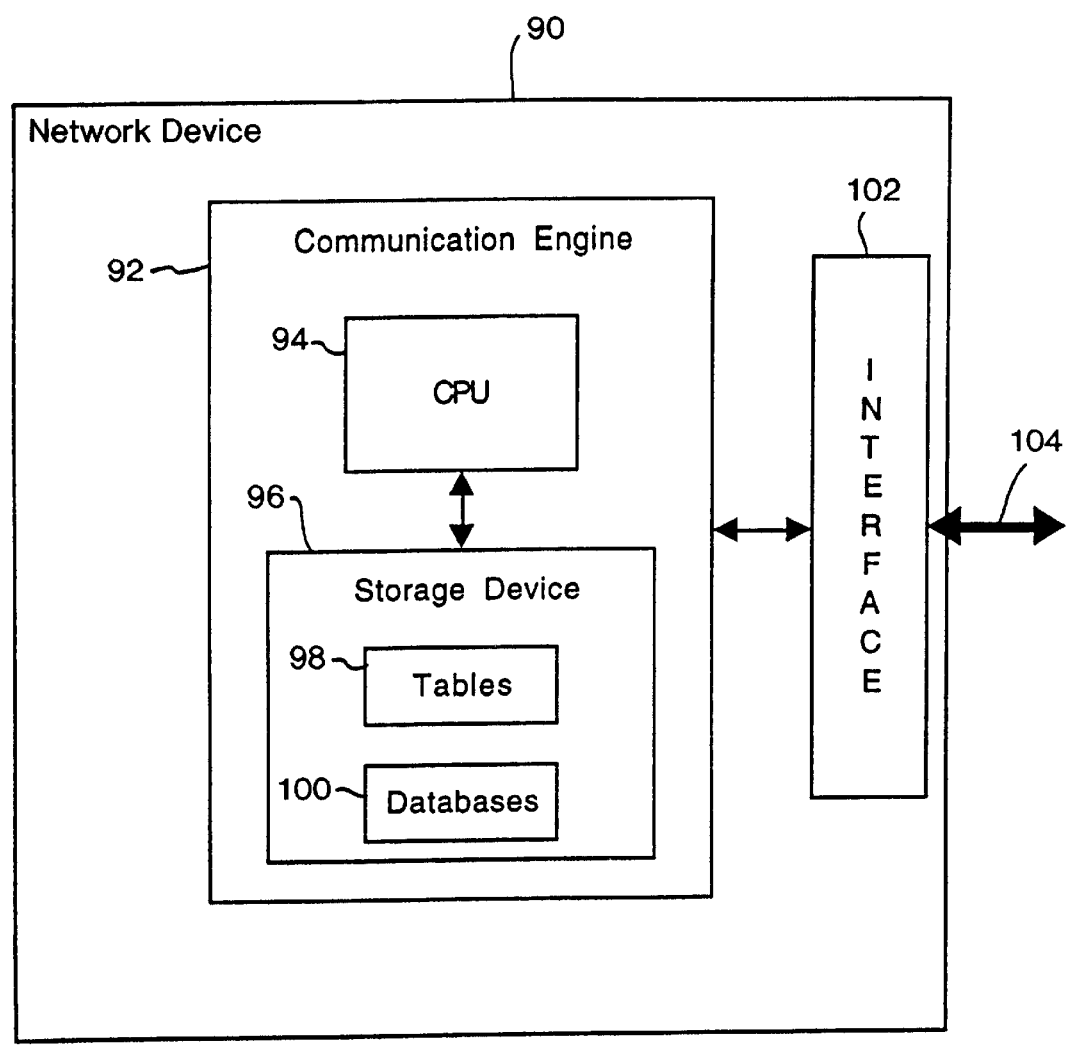
FIG. 3 illustrates a block diagram of a network device capable of implementing the teachings of the present invention.

FIG. 3 illustrates a block diagram of a network device 90 capable of implementing the teachings of the invention. Embodiments of network device 90 include a router, a switch, and other network devices. The network device includes a communication engine 92 having a central processing unit (CPU) 94 and a storage device 96. Various types of CPUs 94 may be used in network device 90. Storage device 96 may be a memory, disk drive, or other mechanism capable of storing data. Communication engine 92 includes various tables 98 and databases 100 contained within storage device 96. Tables 98 and databases 100 may include information necessary for network device 90 to properly transmit data and identify routes through a network. Databases 100 may include a Link State Database and a Forwarding Database.

Communication engine 92 is capable of calculating paths through a network based on information contained in tables 98 and databases 100. An interface 102 is coupled to communication engine 92 and provides a physical connection to one or more network links 104. A single interface 102 and a single network link 104 are illustrated in FIG. 3 for clarity. However, a particular network device may have multiple interfaces 102 coupled to multiple network links 104. In an embodiment of the invention, communication engine 92 is capable of performing the functions necessary to construct Shortest Path First (SPF) trees. Those of ordinary skill in the art will appreciate that other types of network communication devices may be used to implement the teachings of the present invention.

An embodiment of the invention recalculates multicast trees only in the areas that are affected by a particular change. Rather than recalculating multicast trees in all areas in response to a topology or group change, the recalculation of multicast trees is limited to the affected areas only.

Figure 4:
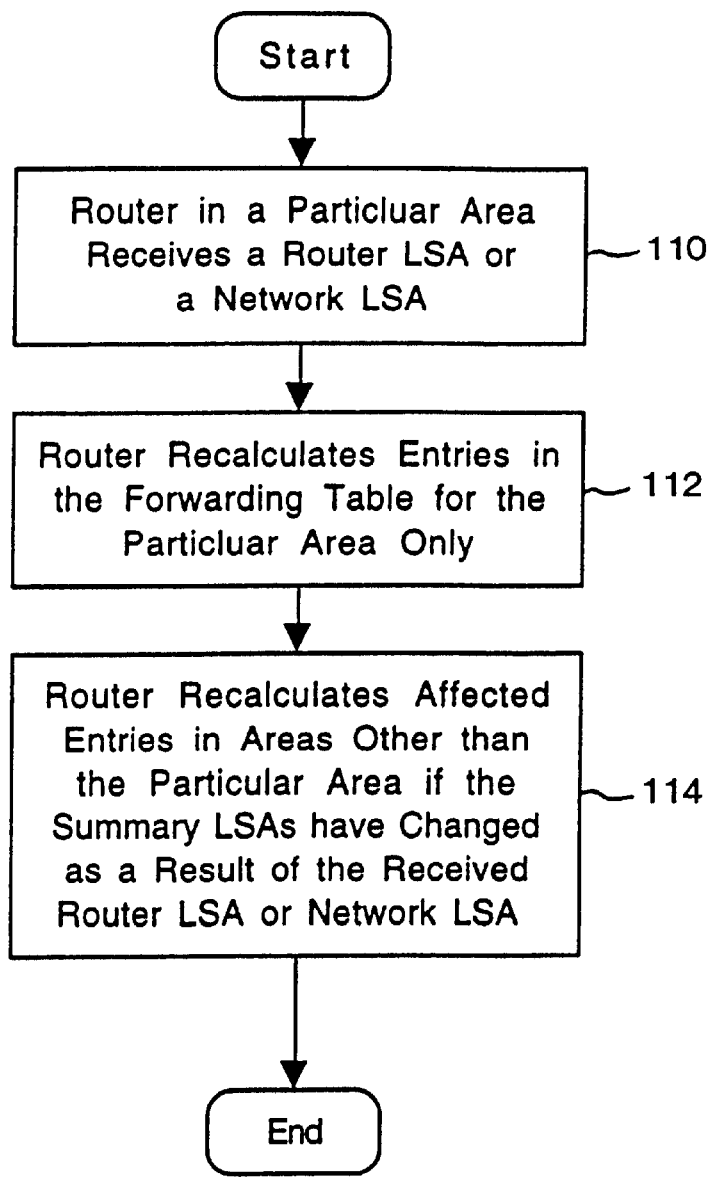
FIG. 4 illustrates an embodiment of a procedure for recalculating multicast trees in response to a topology change or a group change.

FIG. 4 illustrates an embodiment of a procedure for recalculating multicast trees in response to a topology or group change. At step 110 a router in a particular area receives a router Link State Advertisement (LSA), or a network LSA. At step 112, the router that received the LSA recalculates entries in the forwarding table for the particular area in which the router is located. Next, at step 114, the router that received the LSA recalculates affected entries in the forwarding table for areas other than the particular area in which the router is located if the summary LSAs have changed as a result of the received router LSA or network LSA.

An example of the procedure described above with respect to FIG. 4 will be described by referring to the exemplary network shown in FIG. 1. If a new router LSA or network LSA is received in area A by router 36, all forwarding entries are recalculated for area A only. The forwarding entries for areas B and C are not automatically recalculated because the new LSA was received in area A. However, some of the entries in areas B and C may require recalculation because the summary LSAs for areas B and C may change as a result of the new LSA received in area A.

In another example, using the exemplary network in FIG. 1, if a new group membership LSA is received by router 36 in area A, then all forwarding entries related to the group are recalculated in area A. Additionally, the forwarding entries in the backbone area may be recalculated if the backbone area is different from area A and a new group membership LSA is originated in the backbone area due to the new group membership LSA in area A. The backbone area is coupled to all other non-backbone areas. For example, in FIG. 1, area A is the backbone area.

In another embodiment of the invention, forwarding entries are recalculated only when necessary. When a group membership LSA is received or originated, the forwarding entries related to the group are not necessarily recalculated (even in the area to which the group membership LSA belongs). If the originator of the group membership LSA is not reachable from the calculating router within the area, then no downstream interface will be added to reach the group members represented by the group membership LSA. Accordingly, no recalculation is required for that calculating router.

Figure 5:
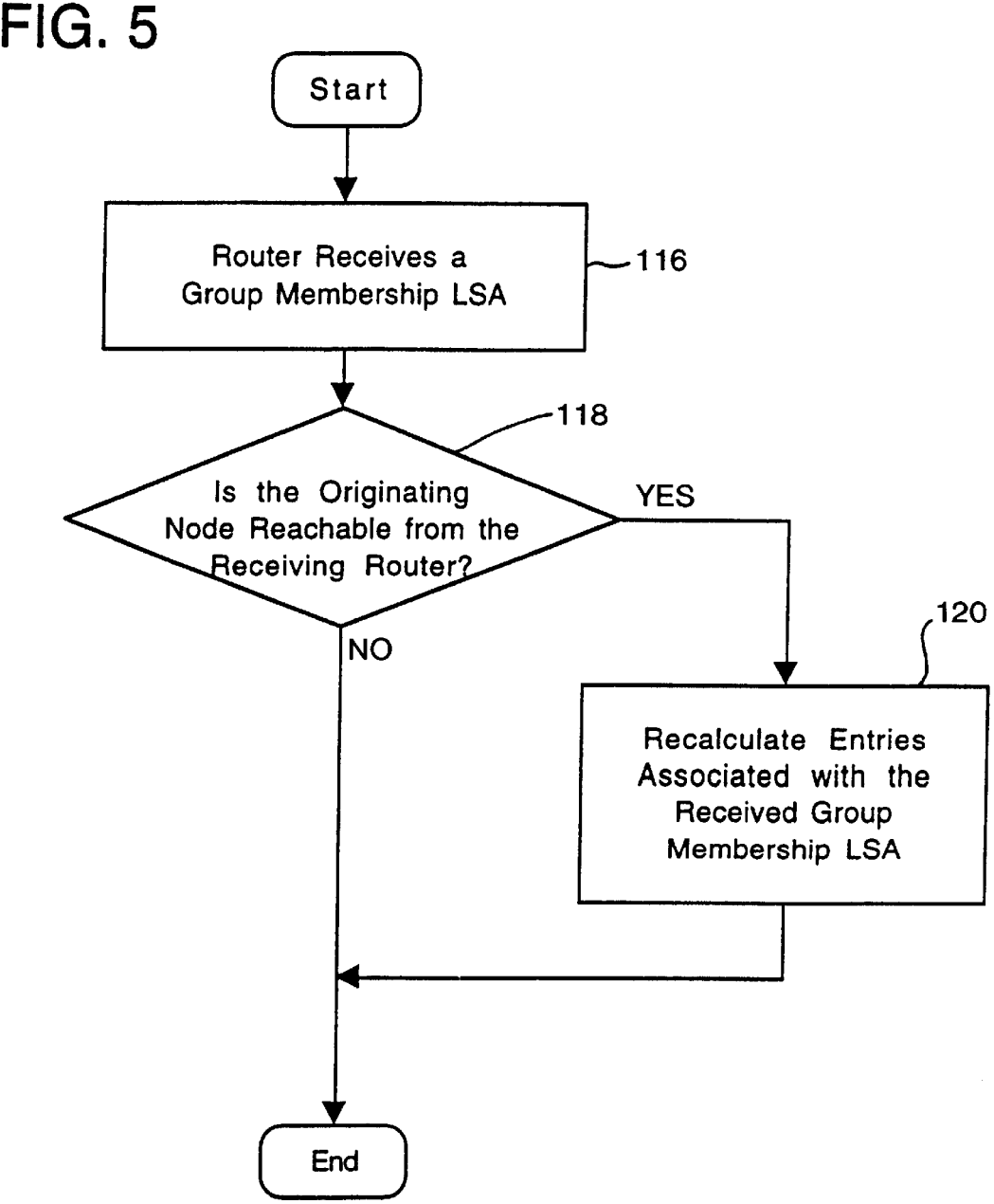
FIG. 5 illustrates an embodiment of a procedure for determining when to recalculate forwarding entries in a multicast tree.

FIG. 5 illustrates an embodiment of a procedure for determining when to recalculate forwarding entries. At step 116, a router receives a group membership LSA. Step 118 determines whether the originating node is reachable from the receiving router (i.e., the router that received the group membership LSA). The originating node is "reachable" from the receiving router if some type of path exists between the node and the router. If the originating node is not reachable from the receiving router, then no changes are made to the forwarding entries in the multicast tree; i.e., the existing forwarding entries in the multicast tree are maintained without any changes. However, if the originating node is reachable from the receiving router, then the procedure branches to step 120 where the procedure recalculates entries associated with the received group membership LSA (step 116). The process of recalculating entries associated with the received group membership LSA is discussed below with reference to FIGS. 6–8. In an embodiment of the invention, the recalculation of entries in step 120 is performed only within the local area.

An example of the procedure described above with reference to FIG. 5 will be discussed using the exemplary network shown in FIG. 1. If router 36 receives a group membership LSA originated by an unknown router such as router x then router 36 will not recalculate forwarding entries related to the group because the router x is not reachable from router 36. However, if router 36 receives a group membership LSA from router 16 (a known and reachable router), then the modified Dijkstra algorithm is executed.

Another embodiment of the invention provides a system for early termination of the execution of a Dijkstra algorithm. The Dijkstra algorithm is a known routing algorithm for determining the best path between a source node and a destination node. The Dijkstra algorithm generally includes a series of "expanding" steps in which a node is placed in the path and its neighbor nodes are examined to determine which node should next be placed in the path. The Dijkstra algorithm terminates when all destination nodes have been placed in the path.

The Dijkstra algorithm is used to construct unicast or multicast trees. Standard OSPF and MOSPF tree-construction procedures terminate the Dijkstra algorithm when the list of candidates is empty (i.e., after the last candidate has been examined). In certain situations, embodiments of the present invention terminate the Dijkstra algorithm before the list of candidates is empty. By terminating the Dijkstra algorithm early, fewer computational resources are used. Significant resources may be saved if the area is large and the router is close to the source, or if the router has few interfaces.

An embodiment of the invention terminates the Dijkstra algorithm when all of the calculating router's interfaces that lead to transit vertices have been put into the forwarding entry. In this situation, no additional downstream interfaces will be added to the forwarding entry, even if the Dijkstra algorithm continues. Therefore, computational resources are saved by terminating the Dijkstra algorithm early.

Figure 6:
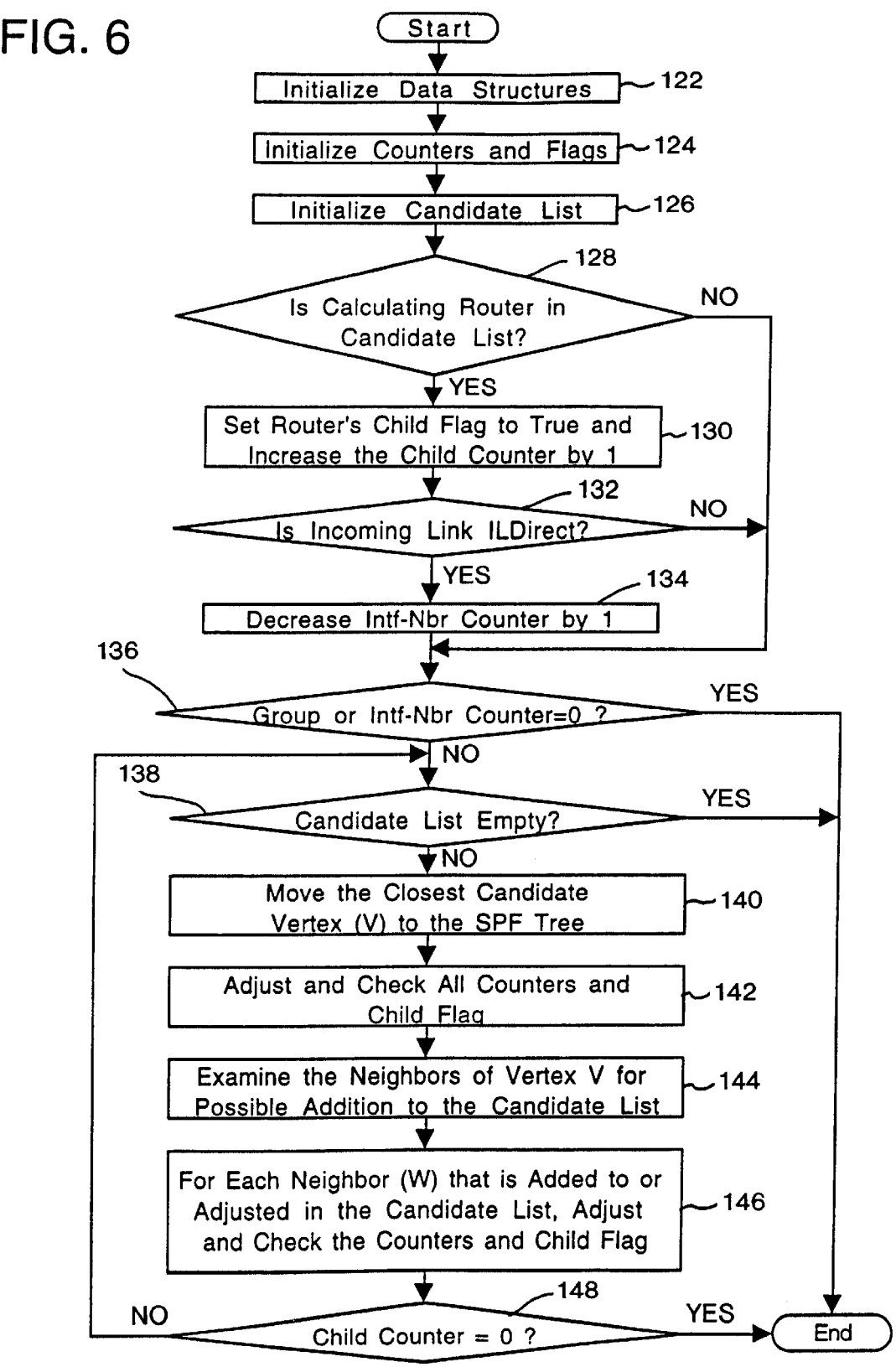
FIG. 6 illustrates an embodiment of an overall procedure for executing a modified Dijkstra algorithm.

FIG. 6 illustrates an embodiment of an overall procedure for executing a modified Dijkstra algorithm. As discussed in greater detail below, the modified Dijkstra algorithm is terminated early in certain situations to minimize unnecessary computations. Step 122 of FIG. 6 initializes the data structures used during execution of the Dijkstra algorithm. Step 124 initializes counters and flags used while executing the modified Dijkstra algorithm. An embodiment of the invention uses three counters (an interface-neighbor counter, abbreviated Intf-Nbr counter, a group counter, and a child counter) and one flag (a child flag) for each vertex. The Intf-Nbr counter is set to the number of interfaces with fully adjacent neighbors in the area. If an interface is configured to forward multicast packets by link-level unicast, then that interface is counted as the number of neighbors with a state of at least 2-way on their interface. All other interfaces are counted as one. The value of the Intf-Nbr counter is recalculated each time the state of an interface changes. The group counter is set to the sum of the number of vertices in all group membership LSAs in the area for the group plus the number of reachable wildcard receivers in the area. A wildcard receiver receives all multicast traffic in its area or domain. The group counter value is recalculated each time a group membership LSA changes in the area. As part of step 124, the child counter is set to 0 and the child flag for each vertex is set to "False."

At step 126 of FIG. 6, the candidate list is initialized. At step 128, the procedure determines whether the calculating router is included in the candidate list. If not, the procedure branches to step 136. If the calculating router is included in the candidate list, then step 130 sets the router's child flag to true and increases the child counter by one. Step 132 determines whether the incoming link is of type ILDirect. An incoming link is type ILDirect if the link is directly connected to source of the multicast flow. If the incoming link is ILDirect, then the procedure decreases the Intf-Nbr counter by one.

At step 136, the procedure determines whether the group counter or the Intf-Nbr counter equals zero. If either counter is zero, then the procedure terminates. If both counters are non-zero, then the procedure continues to step 138 to determine whether the candidate list is empty. If the candidate list is empty, the procedure terminates. If the candidate list is not empty, then the procedure continues to step 140 where the closest candidate vertex (V) is moved to the SPF tree. Step 142 then adjusts and checks all counters and the child flag, as necessary. The procedures performed by step 142 are illustrated in FIG. 7 and discussed below.

Figure 8:
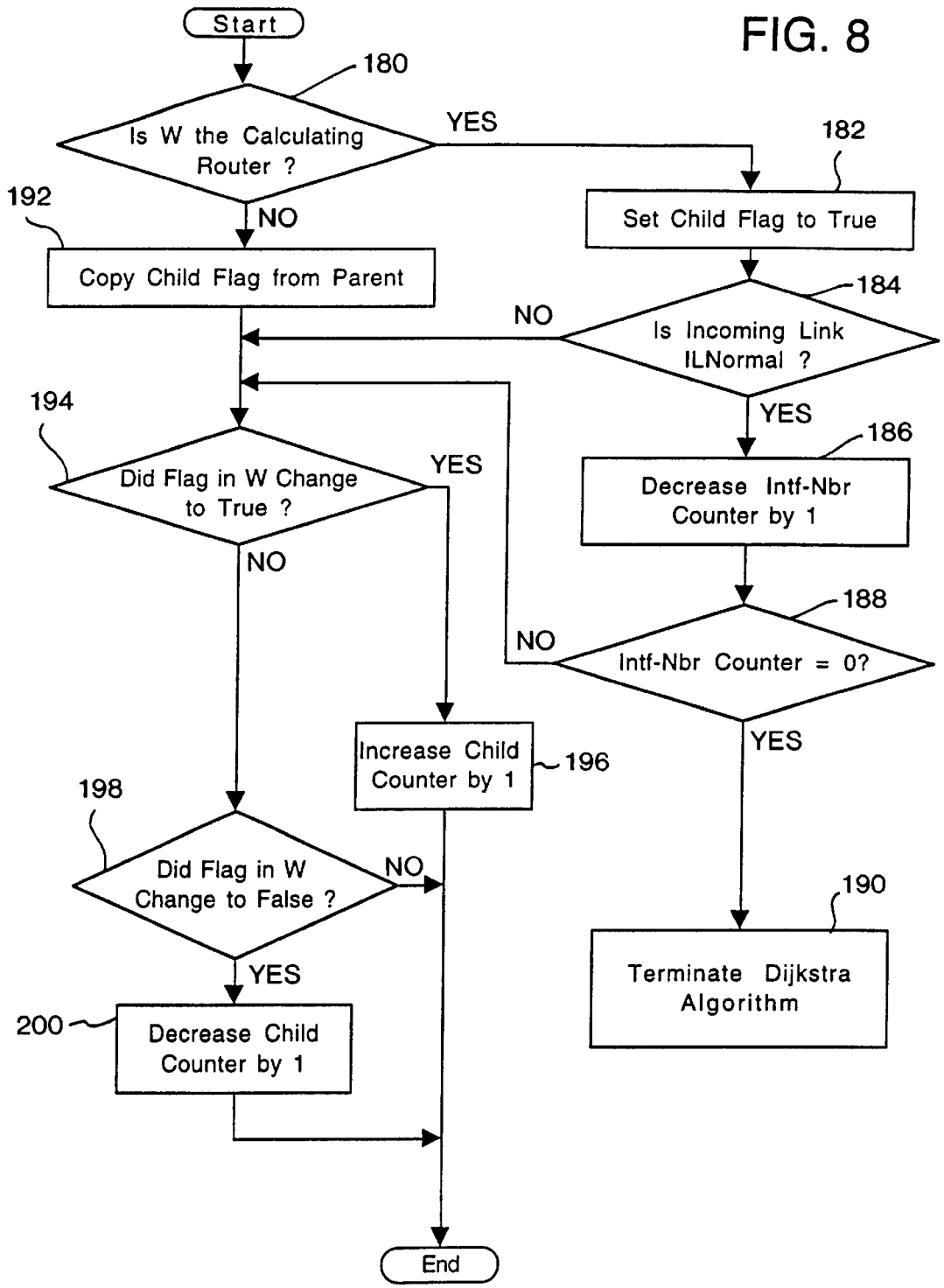
FIG. 8 illustrates an embodiment of a procedure for adjusting and checking counters and flags after a neighbor is added to the candidate list or adjusted in the candidate list.

At step 144 of FIG. 6, the procedure examines the neighbors of vertex V for possible addition to the candidate list. For each neighbor (W) (i.e., a neighbor of V) that is added to the candidate list or adjusted in the candidate list, step 146 adjusts and checks the counters and the child flag, as necessary. The procedures performed by step 146 are illustrated in FIG. 8 and discussed below. If the child counter is zero at step 148, then the procedure terminates. Otherwise, the procedure returns from step 148 to step 138 to determine whether the candidate list is empty.

Figure 7:
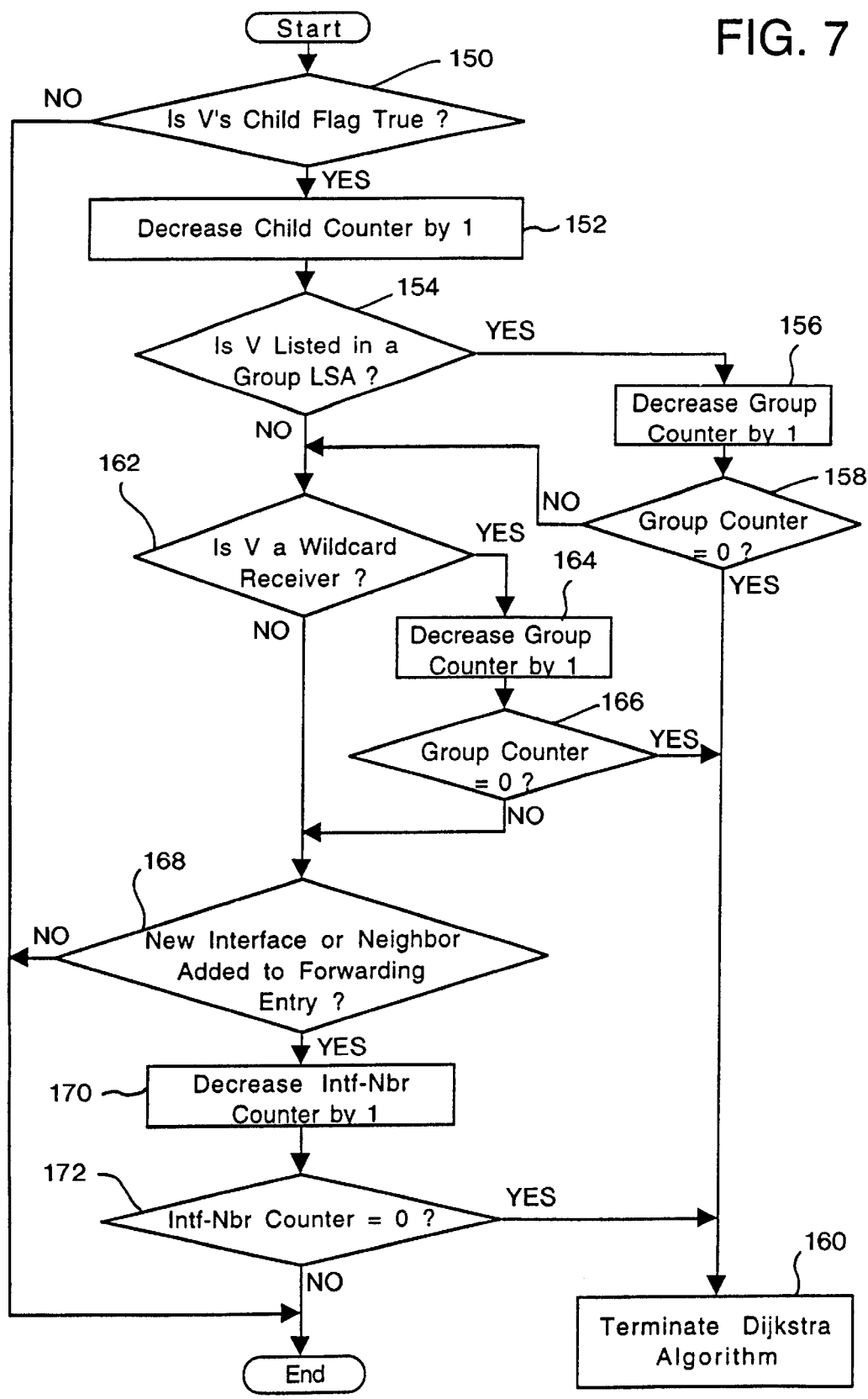
FIG. 7 illustrates an embodiment of a procedure for adjusting and checking counters and flags.

FIG. 7 illustrates an embodiment of a procedure performed by step 142 of FIG. 6; i.e., adjusting and checking all counters and the child flag, as necessary. At step 150, the procedure determines whether vertex V's child flag is True. If False, then the procedure ends (i.e., continues to step 144 in FIG. 6). If V's child flag is True then step 152 decreases the child counter by one. At step 154, the procedure determines whether vertex V is listed in a group LSA. If yes, then the procedure branches to step 156, where the group counter is decreased by one. The procedure continues from step 156 to step 158 to determine whether the group counter is zero. If the group counter is zero, then the procedure terminates the Dijkstra algorithm at step 160 (i.e., terminates the Dijkstra algorithm before its normal termination). If the group counter is not zero at step 158, then the procedure branches to step 162. Similarly, if node V is not listed in a group LSA in step 154, the procedure continues to step 162.

Step 162 determines whether vertex V is a wildcard receiver. If so, the procedure branches to step 164, where the group counter is decreased by one. Step 166 then determines whether the group counter is zero. If the group counter is zero, the Dijkstra algorithm is terminated at step 160. Otherwise, the procedure continues to step 168 to determine whether a new interface or neighbor has been added to the forwarding entry. If no, the procedure ends; i.e., continues to step 144 in FIG. 6. If a new interface or neighbor has been added to the forwarding entry, then the procedure continues to step 170, where the Intf-Nbr counter is decreased by one. At step 172, the procedure determines whether the Intf-Nbr counter is zero. If the Intf-Nbr counter is zero, then the Dijkstra algorithm is terminated at step 160. Otherwise the procedure of FIG. 7 ends, thereby continuing at step 144 in FIG. 6.

FIG. 8 illustrates an embodiment of a procedure performed by step 146 of FIG. 6; i.e., adjusting and checking all counters and the child flag, as necessary, for each neighbor that is added to the candidate list or adjusted in the candidate list. The procedure illustrated in FIG. 8 is executed for each neighbor W that is added to or adjusted in the candidate list. Step 180 determines whether W is the calculating router. If so, the procedure branches to step 182, where the child flag is set to true. Procedure 184 then determines whether the incoming link is of type ILNormal. If the incoming link is ILNormal, then the procedure continues to step 186 to decrease the Intf-Nbr counter by one. Step 188 determines whether the Intf-Nbr counter is zero. If the Intf-Nbr counter is zero, the Dijkstra algorithm terminates at step 190. Otherwise, the procedure branches from step 188 to step 194.

If W is not the calculating router (as determined by step 180), then the procedure continues from step 180 to step 192, where the child flag is copied from the parent. Step 194 determines whether the flag in W changed from False to True. If so, then the child counter is increased by one at step 196, and the procedure ends (continues to step 148 in FIG. 6). If the flag in W did not change from False to True, then the procedure continues to step 198 to determine whether the flag in W changed from True to False. If so, the procedure decreases the child counter by one at step 200.

An example of the procedures described above will be illustrated with reference to the exemplary network shown in FIG. 2. Router 82 has two active transmit interfaces in the area (one interface to network 80 and a second interface to network 84). Thus, the Intf-Nbr counter is set to 2. Router 82 is the calculating router and is constructing a multicast tree for a particular flow identified as: source, group. A group member 85 is coupled to network 84. When router 82 is reached from router 74, the Intf-Nbr counter is decreased to 1 because the incoming interface type is ILNormal. Router 82 then adds its network 84 interface to the forwarding entry for the flow because there is a group member on network 84. At this point, the Intf-Nbr counter is decreased to 0 and the Dijkstra algorithm is terminated. Although the topology beyond router 76 has not yet been reached, there is no reason to continue with the Dijkstra algorithm because the algorithm has already accounted for all interfaces.

Embodiments of the invention terminate the Dijkstra algorithm when no additional candidates are possible downstream from the calculating router. If there are no possible downstream interfaces to be added, then there is no reason to continue the Dijkstra algorithm. This condition is determined by maintaining a counter for DownStream Neighbors. For example, using the exemplary network of FIG. 2, if router 82 is constructing the multicast tree, then the DownStream Neighbors counter is increased to 1 when network 84 is added to the candidate list. It is then removed from the candidate list to the SPF tree and router 36 is added to the candidate list so that the DownStream Neighbors counter remains 1. Router 36 is then moved to the SPF tree so that the count becomes 0 again, indicating that no additional vertices on the candidate list are possible downstream from router 82. Therefore, the Dijkstra algorithm terminates.

In another embodiment of the invention, the Dijkstra algorithm is terminated when all reachable group membership LSAs have been considered. If all group membership LSAs have been considered, then no additional downstream interfaces will be added to the SPF tree. For example, in the exemplary network of FIG. 2, router 82 originated a group membership LSA containing a network vertex (for the group on network 84). Therefore, the counter is set to 1 at the beginning of router 82 Dijkstra algorithm. When network 84 is reached from router 82, the group membership LSA is checked and the counter is decreased to 0, thereby terminating the Dijkstra algorithm. It is not necessary to explore the topology beyond router 76 because there are no additional members.

Therefore, the systems described above provide various procedures and algorithms for reducing the calculation burden when constructing an SPF tree.

Embodiments of the invention may be represented as a software product stored on a computer-readable (or processor-readable) medium. The computer-readable medium may be any type of magnetic, optical, or electrical storage medium including a diskette, CAROM, memory device (volatile or non-volatile), or similar storage medium. The computer-readable medium may contain various sets of instructions, code sequences, configuration information, or other data. For example, empty tables or databases (e.g., tables and databases containing null fields) may be stored on the computer-readable medium. Additionally, instructions or code sequences for handling data packets may be stored on the computer-readable medium. The procedures described above for constructing SPF trees may also be stored on a computer-readable medium. Those of ordinary skill in the art will appreciate that other instructions and operations necessary to implement the described invention may also be stored on a computer-readable medium.

In alternative embodiments, the present invention may be applicable to implementations of the invention in integrated circuits or chip sets, wireless implementations, switching systems products and transmission systems products. For purposes of this application, the term switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

From the above description and drawings, it will be understood by those of ordinary skill in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A method of maintaining a multicast tree, the method comprising:
    calculating forwarding entries of the multicast tree;
    identifying a change associated with a particular network area;
    recalculating forwarding entries in the particular network area in response to identifying the change; and
    recalculating forwarding entries affected by changed summary information in other areas in response to identifying the change, wherein the changed summary information results from the identified change.

2. The method of claim 1 wherein the method is executed using the Multicast Open Shortest Path First (MOSPF) protocol.

3. The method of claim 1 wherein the identified change is a network topology change.

4. The method of claim 1 wherein the identified change is a multicast group change.

5. The method of claim 1 wherein the method is performed by a network routing device.

6. The method of claim 1 wherein the method is performed by a switching system product.

7. The method of claim 1 wherein the method is performed by a transmission system product.

8. A method for maintaining multicast trees, the method comprising:
    calculating forwarding entries of the multicast trees;
    receiving a new group membership link state advertisement (LSA) associated with a group;
    determining whether the originator of the new group membership LSA is reachable from a calculating router; and
    if the originator of the new group membership LSA is reachable from the calculating router
        recalculating forwarding entries associated with the group in response to receiving the new group membership LSA, otherwise,
        maintaining forwarding entries associated with the group without the recalculating of forwarding entries.

9. The method of claim 8 wherein the method is executed using the Multicast Open Shortest Path First (MOSPF) protocol.

10. The method of claim 8 wherein the method is performed by a network routing device.

11. The method of claim 8 wherein the method is performed by a switching system product.

12. The method of claim 8 wherein the method is performed by a transmission system product.

13. A method for determining when to terminate construction of a multicast tree, the method comprising:
    determining the number of interfaces having adjacent neighbors;
    initializing a value in a counter to the number of interfaces that have adjacent neighbors;
    decrementing the value in the counter if an interface is added to a forwarding table; and
    terminating construction of the multicast tree if the value in the counter reaches zero.

14. The method of claim 13 wherein
    the determining the number of interfaces having adjacent neighbors considers only those neighbors in a same area as a calculating router.

15. The method of claim 13 wherein
    the determining the number of interfaces having adjacent neighbors includes
        counting all neighbors on an interface if the interface is configured to forward multicast packets using link-level unicast.

16. The method of claim 13 wherein the method is performed by a network routing device.

17. The method of claim 13 wherein the method is performed by a switching system product.

18. The method of claim 13 wherein the method is performed by a transmission system product.

19. The method of claim 13 wherein the counter is an interface-neighbor counter.

20. The method of claim 13 further comprising
    repeating the determining the number of interfaces that have adjacent neighbors and the initializing the value of the counter with the number, each time the state of an interface changes.

21. The method of claim 13 wherein
    the Dijkstra algorithm is used to construct the multicast tree and is terminated by the terminating construction of the multicast tree when the value in the counter reaches zero to conserve computational resources.

22. A method for determining when to terminate construction of a multicast tree, the method comprising:

initializing a counter to zero, the counter to count downstream vertexes;

incrementing the counter when a downstream vertex of the calculating router is added to a candidate list;

decrementing the counter when a downstream vertex of the calculating router is moved to the multicast tree from the candidate list; and terminating construction of the multicast tree when the counter reaches zero.

23. The method of claim 22 wherein the method is performed by a network routing device.

24. The method of claim 22 wherein the method is performed by a switching system product.

25. The method of claim 22 wherein the method is performed by a transmission system product.

26. The method of claim 22 wherein the counter is a downstream-neighbors counter.

27. The method of claim 22 further comprising:

incrementing the counter twice for a vertex that is both a router vertex and a network vertex.

28. The method of claim 22 wherein the candidate list is a list of network devices or nodes of vertices.

29. The method of claim 22 wherein the Dijkstra algorithm is used to construct the multicast tree and is terminated by the terminating construction of the multicast tree when the value in the counter reaches zero to conserve computational resources.

30. A method for determining when to terminate construction of a multicast tree, the method comprising:

determining a number of reachable group membership link state advertisements (LSAs) associated with the multicast tree;

initializing a value in a counter to the number of reachable group membership link state advertisements (LSAs) associated with the multicast tree;

decrementing the value in the counter when a group membership LSA is considered; and terminating construction of the multicast tree when the value in the counter reaches zero.

31. The method of claim 30 wherein the method is performed by a network routing device.

32. The method of claim 30 wherein the method is performed by a switching system product.

33. The method of claim 30 wherein the method is performed by a transmission system product.

34. The method of claim 30 wherein the Dijkstra algorithm is used to construct the multicast tree and is terminated by the terminating construction of the multicast tree when the value in the counter reaches zero to conserve computational resources.

35. A method for determining when to terminate construction of a multicast tree, the method comprising:

counting, using a counter, a number of reachable group membership link state advertisements (LSAs) associated with the multicast tree and counting twice each group membership LSA that contains both a router vertex and a network vertex;

decrementing the counter when a group membership LSA is considered; and terminating construction of the multicast tree when the counter reaches zero.

36. The method of claim 35 wherein the Dijkstra algorithm is used to construct the multicast tree and is terminated by the terminating construction of the multicast tree when the value in the counter reaches zero to conserve computational resources.

37. The method of claim 35 wherein the method is preformed by one of a network routing device, a switching system product, or a transmission system product.

38. A computer software product including a medium readable by a processor to maintain multicast trees, the medium having stored thereon a sequence of instructions which, when executed by the processor, cause the processor to:

calculate forwarding entries in a particular network area;

identify a change associated with the particular network area;

recalculate forwarding entries in the particular network area in response to identifying the change; and recalculate forwarding entries affected by the changed summary information in other areas in response to identifying the chance, wherein the changed summary information results from the identified change.

39. The computer software product of claim 38 wherein the identified change is a network topology change.

40. The computer software product of claim 38 wherein the identified change is a multicast group change.

41. A method for determining when to terminate construction of a multicast tree, the method comprising:

determining the number of vertices in all group membership link state advertisements (LSAs) in the area for a group;

determining the number of reachable wildcard receivers in the area;

determining a sum by summing together the number of vertices in all group LSAs in the area for the group and the number of reachable wildcard receivers in the area;

initializing a value in a counter to the sum;

decrementing the value in the counter if a vertex is listed in a group link state advertisement (LSA); and terminating construction of the multicast tree if the value in the counter reaches zero.

42. The method of claim 41 wherein the counter is a group counter.

43. The method of claim 41 further comprising:

decrementing the value in the counter if the vertex is a wildcard receiver.

44. The method of claim 41 wherein the Dijkstra algorithm is used to construct the multicast tree and is terminated by the terminating construction of the multicast tree when the value in the counter reaches zero to conserve computational resources.

45. A method for determining when to terminate construction of a multicast tree, the method comprising:

summing together a number of vertices in all group LSAs in an area for a group and a number of reachable wildcard receivers in the area;

initializing a value in a first counter to the sum;

determining the number of interfaces that have adjacent neighbors;

initializing a value in a second counter to the number of interfaces that have adjacent neighbors;

decrementing the value in the first counter if a vertex is listed in a group link state advertisement (LSA);

decrementing the value in the second counter if an interface is added to a forwarding table; and terminating construction of the multicast tree if the value in the first counter or the value in the second counter reaches zero.

46. The method of claim 45 wherein the first counter is a group counter and the second counter is an interface-neighbor counter.

47. The method of claim 45 further comprising:

decrementing the value in the first counter if the vertex is a wildcard receiver.

48. The method of claim 45 wherein the Dijkstra algorithm is used to construct the multicast tree and is terminated by the terminating construction of the multicast tree when the value in the counter reaches zero to conserve computational resources.

49. A method for conserving computation resources in a network device to maintain a network tree, the method comprising:

using a Dijkstra algorithm to calculate the network tree in a network area; and terminating the Dijkstra algorithm early after completion of the network tree in the network area and before completion of the Dijkstra algorithm in order to minimize unnecessary computations.

50. The method of claim 49 wherein
the network tree is a unicast tree.

51. The method of claim 49 wherein
the network tree is a multicast tree.

52. The method of claim 49 wherein
the Dijkstra algorithm is terminated when all of a calculating router's interfaces that lead to transit vertices have been placed into a forwarding entry.

53. The method of claim 49 wherein
the Dijkstra algorithm is terminated when all of a calculating router's interfaces that have adjacent neighbors have been added to a forwarding table for the network tree.

54. The method of claim 49 wherein
the Dijkstra algorithm is terminated before the list of candidates is empty.

55. The method of claim 49 wherein
the Dijkstra algorithm is terminated when no additional candidates are possible downstream from the calculating router.

56. The method of claim 49 wherein
the Dijkstra algorithm is terminated when all of a calculating router's downstream vertices have been moved to the network tree.

57. The method of claim 49 wherein
the Dijkstra algorithm is terminated when all reachable group membership link state advertisements have been considered.

58. The method of claim 49 wherein
the Dijkstra algorithm completes the network tree when all destination nodes have been placed in a path.

* * * * *